United States Patent
Toyoshima et al.

(10) Patent No.: US 10,208,976 B2
(45) Date of Patent: Feb. 19, 2019

(54) AIR-CONDITIONING VENTILATION SYSTEM

(71) Applicant: Mitsubishi Electric Corporation, Tokyo (JP)

(72) Inventors: Masaki Toyoshima, Tokyo (JP); Emi Takeda, Tokyo (JP); Shinichi Ito, Tokyo (JP); Toshiaki Yoshikawa, Tokyo (JP); Haruyuki Hirasawa, Tokyo (JP); Atsushi Shinno, Tokyo (JP); Hiroki Aoki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 61 days.

(21) Appl. No.: 15/306,809

(22) PCT Filed: May 9, 2014

(86) PCT No.: PCT/JP2014/062527
§ 371 (c)(1),
(2) Date: Oct. 26, 2016

(87) PCT Pub. No.: WO2015/170414
PCT Pub. Date: Nov. 12, 2015

(65) Prior Publication Data
US 2017/0051937 A1 Feb. 23, 2017

(51) Int. Cl.
*G05B 21/00* (2006.01)
*G01M 1/38* (2006.01)
(Continued)

(52) U.S. Cl.
CPC .............. *F24F 11/30* (2018.01); *F24F 11/62* (2018.01); *F24F 11/89* (2018.01); *G05B 15/02* (2013.01);
(Continued)

(58) Field of Classification Search
CPC ............... F24F 2120/10; F24F 2120/12; F24F 2120/14; F24F 11/30; F24F 11/56; F24F 11/64; F24F 11/89; G05B 15/02
(Continued)

(56) References Cited

U.S. PATENT DOCUMENTS

2010/0025483 A1* 2/2010 Hoeynck ................... H02J 3/14
236/1 C
2010/0235004 A1* 9/2010 Thind ..................... G05B 15/02
700/277

(Continued)

FOREIGN PATENT DOCUMENTS

JP 62-106236 A 5/1987
JP 08-061741 A 3/1996
(Continued)

OTHER PUBLICATIONS

EESR dated Dec. 15, 2017 in corresponding EP patent application No. 14891385.8.
(Continued)

*Primary Examiner* — Mohammad Ali
*Assistant Examiner* — Md Azad
(74) *Attorney, Agent, or Firm* — Posz Law Group, PLC

(57) ABSTRACT

An air-conditioning ventilation system of the present invention includes one or a plurality of air circulation devices configured to circulate air among a plurality of rooms, one or a plurality of air-conditioning apparatuses provided in at least one of the plurality of rooms, a human detector provided in each of the plurality of rooms and configured to detect a human present in a corresponding one of the rooms in which the human detector is provided, an optimal air-conditioning ventilation operation estimating unit configured to estimate presence or absence of any human in each of the plurality of rooms, or a human presence ratio repre-
(Continued)

senting a number of humans present per unit time in each of the plurality of rooms, on a basis of a past result of detection by the human detector, and a controller configured to control the air circulation device and the air-conditioning apparatus on a basis of a result of estimation by the optimal air-conditioning ventilation operation estimating unit.

15 Claims, 3 Drawing Sheets

(51) Int. Cl.
<table><tr><td>G05B 13/00</td><td>(2006.01)</td></tr><tr><td>G05B 15/00</td><td>(2006.01)</td></tr><tr><td>G05D 23/00</td><td>(2006.01)</td></tr><tr><td>F24F 11/30</td><td>(2018.01)</td></tr><tr><td>F24F 11/89</td><td>(2018.01)</td></tr><tr><td>F24F 11/62</td><td>(2018.01)</td></tr><tr><td>G05B 15/02</td><td>(2006.01)</td></tr><tr><td>F24F 11/56</td><td>(2018.01)</td></tr><tr><td>F24F 11/64</td><td>(2018.01)</td></tr><tr><td>F24F 120/12</td><td>(2018.01)</td></tr><tr><td>F24F 120/10</td><td>(2018.01)</td></tr><tr><td>F24F 110/10</td><td>(2018.01)</td></tr><tr><td>F24F 120/14</td><td>(2018.01)</td></tr></table>

(52) U.S. Cl.
CPC .............. *F24F 11/56* (2018.01); *F24F 11/64* (2018.01); *F24F 2110/10* (2018.01); *F24F 2120/10* (2018.01); *F24F 2120/12* (2018.01); *F24F 2120/14* (2018.01)

(58) Field of Classification Search
USPC ........................................................ 700/277
See application file for complete search history.

(56) References Cited

U.S. PATENT DOCUMENTS

<table><tr><td>2011/0313579</td><td>A1*</td><td>12/2011</td><td>Ling</td><td>H04L 12/2814<br>700/291</td></tr><tr><td>2012/0018639</td><td>A1*</td><td>1/2012</td><td>Matsumoto</td><td>F24F 1/0007<br>250/353</td></tr><tr><td>2012/0239213</td><td>A1</td><td>9/2012</td><td>Nagata et al.</td><td></td></tr><tr><td>2015/0011153</td><td>A1*</td><td>1/2015</td><td>Oswald</td><td>F24F 3/161<br>454/187</td></tr></table>

FOREIGN PATENT DOCUMENTS

<table><tr><td>JP</td><td>2000-088316 A</td><td>3/2000</td></tr><tr><td>JP</td><td>2004-293849 A</td><td>10/2004</td></tr><tr><td>JP</td><td>2004-293850 A</td><td>10/2004</td></tr><tr><td>JP</td><td>2007-107871 A</td><td>4/2007</td></tr><tr><td>JP</td><td>4145689 B</td><td>6/2008</td></tr><tr><td>JP</td><td>2009-250589 A</td><td>10/2009</td></tr><tr><td>JP</td><td>2011-007359 A</td><td>1/2011</td></tr><tr><td>JP</td><td>2012-194700 A</td><td>10/2012</td></tr></table>

OTHER PUBLICATIONS

International Search Report of the International Searching Authority dated Aug. 5, 2014 for the corresponding international application No. PCT/JP2014/062527 (and English translation).
Office action dated Oct. 10, 2017 in corresponding JP patent application No. 2016-517789 (and English translation attached).
Office action dated Nov. 5, 2018 issued in corresponding CN patent application No. 201480079163.1 (and English translation thereof).

* cited by examiner

AIR-CONDITIONING VENTILATION SYSTEM

CROSS REFERENCE TO RELATED APPLICATION

This application is a U.S. national stage application of PCT/JP2014/062527 filed on May 9, 2014, the contents of which are incorporated herein by reference.

TECHNICAL FIELD

The present invention relates to an air-conditioning ventilation system including a ventilation device that circulates air among a plurality of rooms.

BACKGROUND ART

As an example of an air circulation system that mutually circulates indoor air among a plurality of indoor rooms, there is a technique described in Patent Literature 1, for example. The technique described in Patent Literature 1 is described as being capable of bringing the room temperature of a room with human presence close to the target room temperature thereof by effectively using the heat energy of a room without human presence, and consequently being capable of enhancing the room temperature environment of the room with human presence to a comfortable environment.

CITATION LIST

Patent Literature

Patent Literature 1: Japanese Patent No. 4145689 (claim 1)

SUMMARY OF INVENTION

Technical Problem

The technique described in Patent Literature 1, however, only operates a ventilation device to move the indoor air by determining the presence or absence of any human at the current moment (current time).

The technique therefore moves the indoor air after detection of a human, resulting in an issue of impaired comfort.

Meanwhile, supplying heat energy into a room not scheduled to have human presence degrades the energy saving performance.

Therefore, an air-conditioning ventilation system has been desired which accomplishes both comfort and energy saving performance, being capable of estimating the future human presence in a room and previously supplying heat energy into the room before the human presence in the room, and not consuming unnecessary energy.

Further, individuals have respective preferences in the setting of air-conditioning. For example, individuals present in a room may have different preferences; some people may prefer the setting temperature to be high in a cooling operation.

For this reason, an air-conditioning ventilation system has been desired which is capable of performing air-conditioning according to the preferences of individuals present in a room and improving the comfort.

The present invention has been made with the above-described issues as background, and obtains an air-conditioning ventilation system that accomplishes both the comfort and the energy saving performance.

Solution to Problem

An air-conditioning ventilation system according to one embodiment of the present invention includes one or a plurality of ventilation devices configured to circulate air among a plurality of rooms; one or a plurality of air-conditioning apparatuses provided in at least one of the plurality of rooms; a human detector provided in each of the plurality of rooms and configured to detect a human present in a corresponding one of the rooms in which the human detector is provided; an estimation unit configured to estimate presence or absence of any human in each of the plurality of rooms, or a human presence ratio representing a number of humans present per unit time in each of the plurality of rooms, on a basis of a past result of detection by the human detector, and a controller configured to control the ventilation device and the air-conditioning apparatus on a basis of a result of estimation by the estimation unit.

Advantageous Effects of Invention

The present invention estimates the presence or absence of any human in each of the plurality of rooms or the human presence ratio of each of the plurality of rooms, and controls the ventilation device and the air-conditioning apparatus on the basis of the result of the estimation. The present invention therefore is capable of accomplishing both the comfort and the energy saving performance.

DESCRIPTION OF EMBODIMENTS

Embodiment 1

<<System Configuration>>

Figure 1:
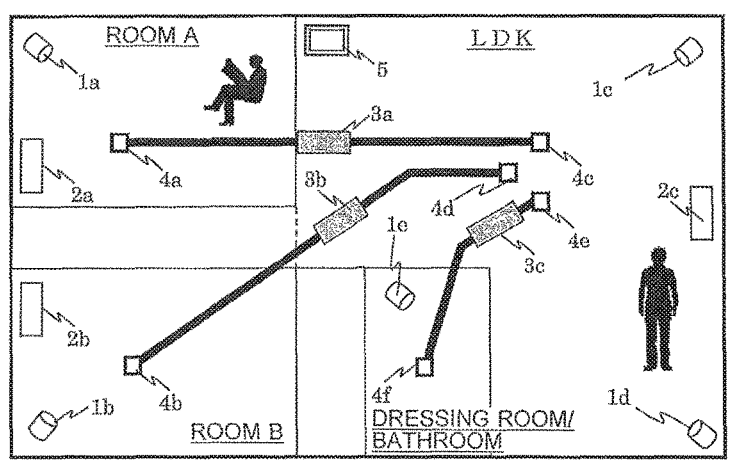
FIG. 1 is a diagram of a housing layout illustrating a schematic configuration of an air-conditioning ventilation system according to Embodiment 1.

FIG. 1 is a diagram of a housing layout illustrating a schematic configuration of an air-conditioning ventilation system according to Embodiment 1.

As illustrated in FIG. 1, the air-conditioning ventilation system air-conditions a plurality of rooms provided in housing or other types of construction.

The air-conditioning ventilation system includes a sensor unit 1 (1a to 1e), an air-conditioning apparatus 2 (2a to 2c), an air circulation device 3 (3a to 3c), and a controller 5.

The air circulation device 3 (3a to 3c) circulates air among a plurality of rooms. One or a plurality of air circulation devices 3 is/are provided. For example, if there are two rooms to be air-conditioned, one air circulation device 3 is provided between the two rooms. Further, if there are three or more rooms to be air-conditioned, a plurality of air circulation devices 3 are provided.

The air circulation device 3 includes therein a fan, a motor, and a duct. The solid lines in FIG. 1 represent ducts. The air circulation device 3 is operable in a forward or reverse air blow direction. An air supply and exhaust port 4 (4a to 4f) corresponds to an inlet or outlet of the air circulation device 3, and serves as an air inlet for air into a room or an air outlet for air therefrom.

Since the air circulation device 3 is operable in the forward or reverse air blow direction, the air blow direction may be changed in accordance with the air-conditioned state of each of the rooms. Although not illustrated, a structure is provided in which the air blown by the air circulation device is circulated through a space such as an undercut provided under a door.

Although the example in FIG. 1 illustrates a case with three air circulation devices 3, the present invention is not limited thereto. For example, the air circulation device 3 for circulating air may be provided between a room A and a room B and/or between the room B and a dressing room/bathroom.

The air-conditioning apparatus 2 (2a to 2c), which is a room air-conditioner, for example, performs a heating or cooling operation to air-condition the interior of a room equipped with the room air-conditioner. The air-conditioning apparatus 2 is provided in at least one of the plurality of rooms. In the example in FIG. 1, the dressing room/bathroom is not provided with the air-conditioning apparatus 2, and each of the other rooms is provided with one air-conditioning apparatus 2.

One unit or a plurality of units of the sensor unit 1 (1a to e) is/are provided in each of the plurality of rooms.

The sensor unit 1 and the controller 5 are communicably connected wirelessly or by wire, and are bidirectionally communicable.

The air circulation device 3 corresponds to a "ventilation device" of the present invention.

Further, the controller 5 corresponds to a "controller" of the present invention.

Figure 2:
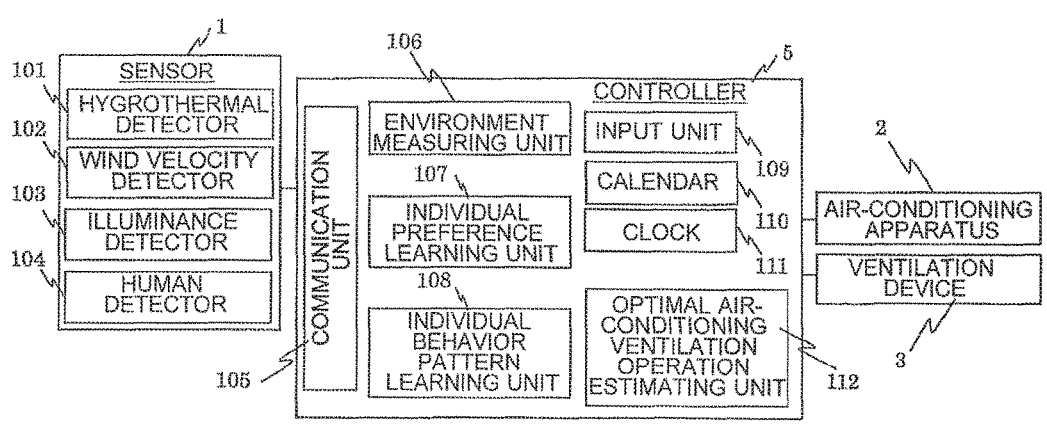
FIG. 2 is a control block diagram illustrating the schematic configuration of the air-conditioning ventilation system according to Embodiment 1.

FIG. 2 is a control block diagram illustrating the schematic configuration of the air-conditioning ventilation system according to Embodiment 1.

As illustrated in FIG. 2, the sensor unit 1 (1a to e) is formed of a group of detectors such as a hygrothermal detector 101, a wind velocity detector 102, an illuminance detector 103, and a human detector 104.

The human detector 104 is capable of recognizing the presence and motion of a human, and employs an infrared system or an image recognition system, for example.

The sensor unit 1 includes at least the human detector 104 that detects a human present in a room and a temperature detector that detects the temperature in the room.

The configuration of the group of detectors is an example, and the sensor unit 1 may also be equipped with indoor air quality-related detectors such as a dust detector, a CO2 concentration detector, and a volatile organic compound (VOC) detector, a radiation temperature detector, and other detectors. Further, the sensor unit 1 is also installed with a driving device, and is capable of acquiring 360-degree omnidirectional information.

The controller 5 includes therein communication unit 105 communicable with the sensor unit 1, the air-conditioning apparatus 2, and the air circulation device 3 by wire or wirelessly, an input unit 109 for inputting information from a user, an environment measuring unit 106, an individual preference learning unit 107, an individual behavior pattern learning unit 108, a calendar 110, a clock 111, an optimal air-conditioning ventilation operation estimating unit 112, and other units.

The optimal air-conditioning ventilation operation estimating unit 112 corresponds to "estimation unit" of the present invention.

The controller 5 is connected to the air-conditioning apparatus 2 and the air circulation device 3, and is bidirectionally communicable therewith. For example, the controller 5 is capable of acquiring operation information of respective units of equipment (such as ON/OFF, temperature setting, an air blow volume, a compressor frequency, and a power consumption amount) and issuing operation instructions from the controller 5 to the units of equipment. Further, the controller 5 controls the air circulation device 3 and the air-conditioning apparatus 2 on the basis of the result of estimation by the optimal air-conditioning ventilation operation estimating unit 112.

The controller 5 may be realized by hardware such as a circuit device that realizes these functions, or may be realized as software executed on an arithmetic device such as a microcomputer or a CPU.

The input unit 109 includes a screen such as a liquid crystal screen, and allows input with buttons, a touch panel, or other devices. The input unit 109 is also capable of transmitting and receiving information with a terminal device, such as a touch panel or a mobile phone, wirelessly or via the Internet.

The environment measuring unit 106 stores environmental information such as the temperature and humidity measured by the sensor unit 1, and is capable of chronologically acquiring and analyzing the environmental information of each of the rooms.

<<Learning of Individual Behaviors, Collection of Air-Conditioning Preferences, and Prediction>>

With user inputs from the input unit 109, the individual preference learning unit 107 is capable of setting information such as air-conditioning preferences of each of individuals, such as a preferred setting temperature and preferred air blow conditions (such as an air volume and whether or not to apply air) in cooling or heating, for example, by subclassifying the information by period, time slot, or another factor.

That is, air-conditioning preference information including at least the setting temperature in each of the rooms is input to the input unit 109 together with information identifying an individual of the plurality of humans (such as a username, for example).

The individual preference learning unit 107 then stores, for each of the plurality of humans, the air-conditioning preference information input to the input unit 109, by classifying the air-conditioning preference information in accordance with at least one of the time, the time slot, the date, and the day of the week.

Further, as to once-set information, it is possible to collect individual preferences by comparing identification of individuals with the human detector 104 with operation information of a remote controller of the air-conditioning apparatus 2 or another apparatus, and to learn changes in the preferences of the individuals, corrections in uncomfortableness, and other information as necessary. With the air-conditioning environment preferences of the individuals thus collected and learned, it is possible to provide information of air-conditioning settings adjusted to different individuals even in the same housing.

With the information from the human detector 104 of the sensor unit 1, the individual behavior pattern learning unit 108 is capable of identifying the individuals in the respective rooms and chronologically learning where the target one of the individuals was at what time. The individual may be identified from at least one of information items such as the height, the mean body temperature (radiation temperature), external appearance information such as the hairstyle, and identification information transmitted from a communication device possessed by the individual such as GPS information of an individual terminal (such as a mobile phone communicable with the controller 5).

That is, individual behavior pattern information identifying the individual entity of a human present in each of the rooms is input to the individual behavior pattern learning unit 108, and the individual behavior pattern learning unit 108 stores the individual behavior pattern information for each of the plurality of rooms by classifying the individual behavior pattern information in accordance with at least one of the time, the time slot, the date, and the day of the week.

The individual behavior pattern learning unit 108 further stores the individual behavior pattern information for a certain past period. The individual behavior pattern learning unit 108 then updates the individual behavior pattern information at each lapse of the time, the time slot, the date, or the day of the week.

Further, by referring to calendar information, the individual behavior pattern learning unit 108 is capable of distinguishing and learning differences in behaviors between weekdays and holidays or differences in behavior patterns among the days of the week.

In the controller 5, activity schedules of the individuals may be input to a scheduler. If there is any discrepancy between the learned information and the individual input scheduler information, the scheduler information takes precedence to thereby allow correction in learning adjusted to the latest activity schedules of the individuals.

The optimal air-conditioning ventilation operation estimating unit 112 predicts a "human presence ratio" and an "optimal air-conditioning setting temperature" in each of the rooms on the basis of the learned information obtained from the individual preference learning unit 107 and the individual behavior pattern learning unit 108.

That is, the optimal air-conditioning ventilation operation estimating unit 112 estimates the human presence ratio of humans present in each of the plurality of rooms on the basis of a past result of detection by the human detector 104.

Herein, the human presence ratio represents the number of humans present per unit time in each of the rooms. For example, the human presence ratio indicates how many humans on average are present in the target room per unit time (30 minutes, for example). A human presence ratio of 100% indicates that one human on average is present per unit time in the room.

Figure 3:
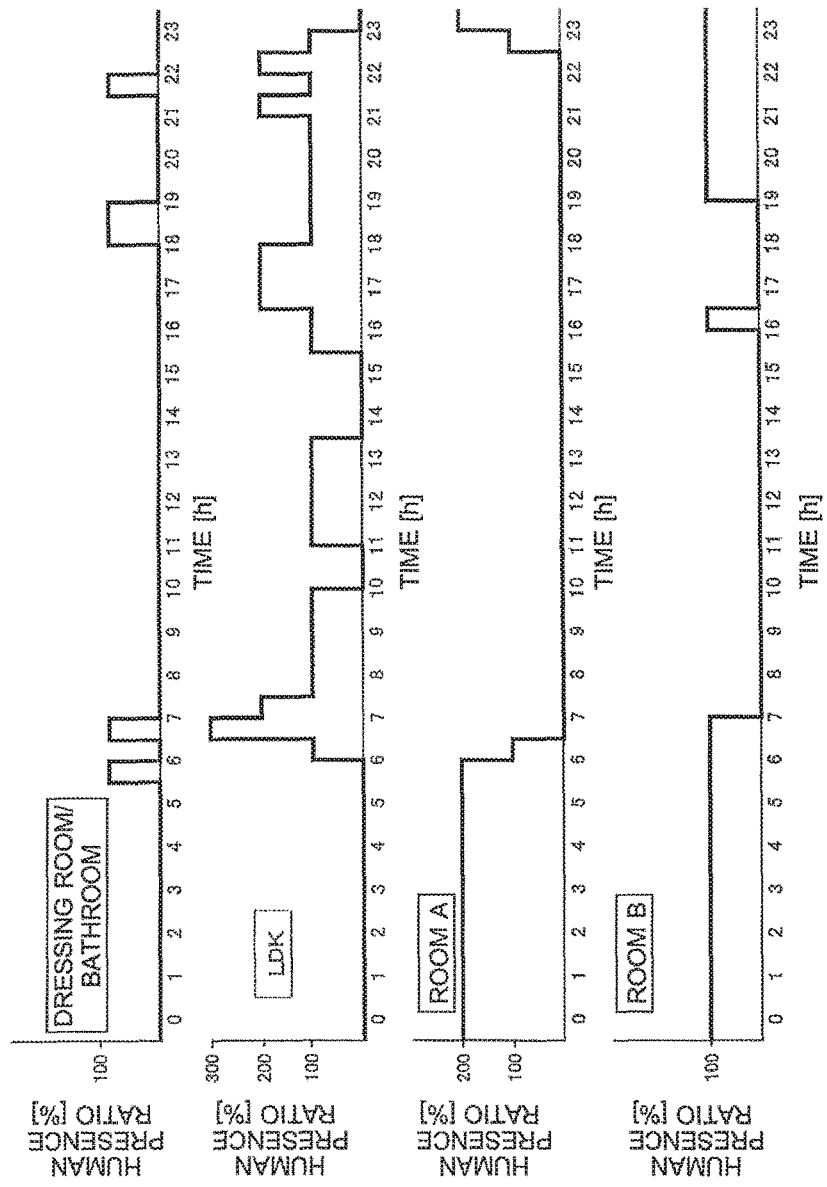
FIG. 3 is a diagram illustrating an example of changes in a human presence ratio in respective rooms.

FIG. 3 is a diagram illustrating an example of changes in the human presence ratio in the respective rooms.

With the information from the sensor unit 1 provided in each of the rooms, the mean human presence ratio per unit time changes as in FIG. 3, for example. With the human presence ratio in each of the rooms thus learned, it is possible to know the necessity or unnecessity of air-conditioning. With these patterns learned every day, it is possible to know the correlation of the patterns with the days of the week.

Further, since the prediction of the human presence ratio as in FIG. 3 is obtained from superimposition of the behavior patterns of the individuals, the prediction is flexibly changeable if any change is scheduled in the behaviors of the individuals (according to the foregoing scheduler).

In Embodiment 1, a description will be given of a case of estimating the human presence ratio of humans present in each of the plurality of rooms. However, the present invention is not limited thereto, and only the presence or absence of any human present in the room may be estimated.

Further, the optimal air-conditioning ventilation operation estimating unit 112 determines the optimal air-conditioning setting temperature for each of the rooms on the basis of the individual behavior pattern information stored in the individual behavior pattern learning unit 108 and the air-conditioning preference information stored in the individual preference learning unit 107.

The optimal air-conditioning ventilation operation estimating unit 112 determines, as the optimal air-conditioning setting temperature, the mean value of the setting temperatures preferred by the individuals present per unit time in the target room (according to the individual preference learning unit 107), for example.

The controller 5 controls the air circulation device 3 and the air-conditioning apparatus 2 on the basis of the human presence ratio and the optimal air-conditioning setting temperature estimated by the optimal air-conditioning ventilation operation estimating unit 112.

The optimal air-conditioning setting temperature corresponds to a "target temperature" of the present invention. In the following description, the optimal air-conditioning setting temperature will be referred to as the setting temperature.

<<Air-Conditioning and Air Circulation Control>>

On the basis of the temperature difference between the temperature detected by the sensor unit 1 and the setting temperature set for each of the rooms and the result of estimation by the optimal air-conditioning ventilation operation estimating unit 112, the controller 5 controls the air circulation device 3 and the air-conditioning apparatus 2 to bring the temperature in the room close to the setting temperature.

Figure 4:
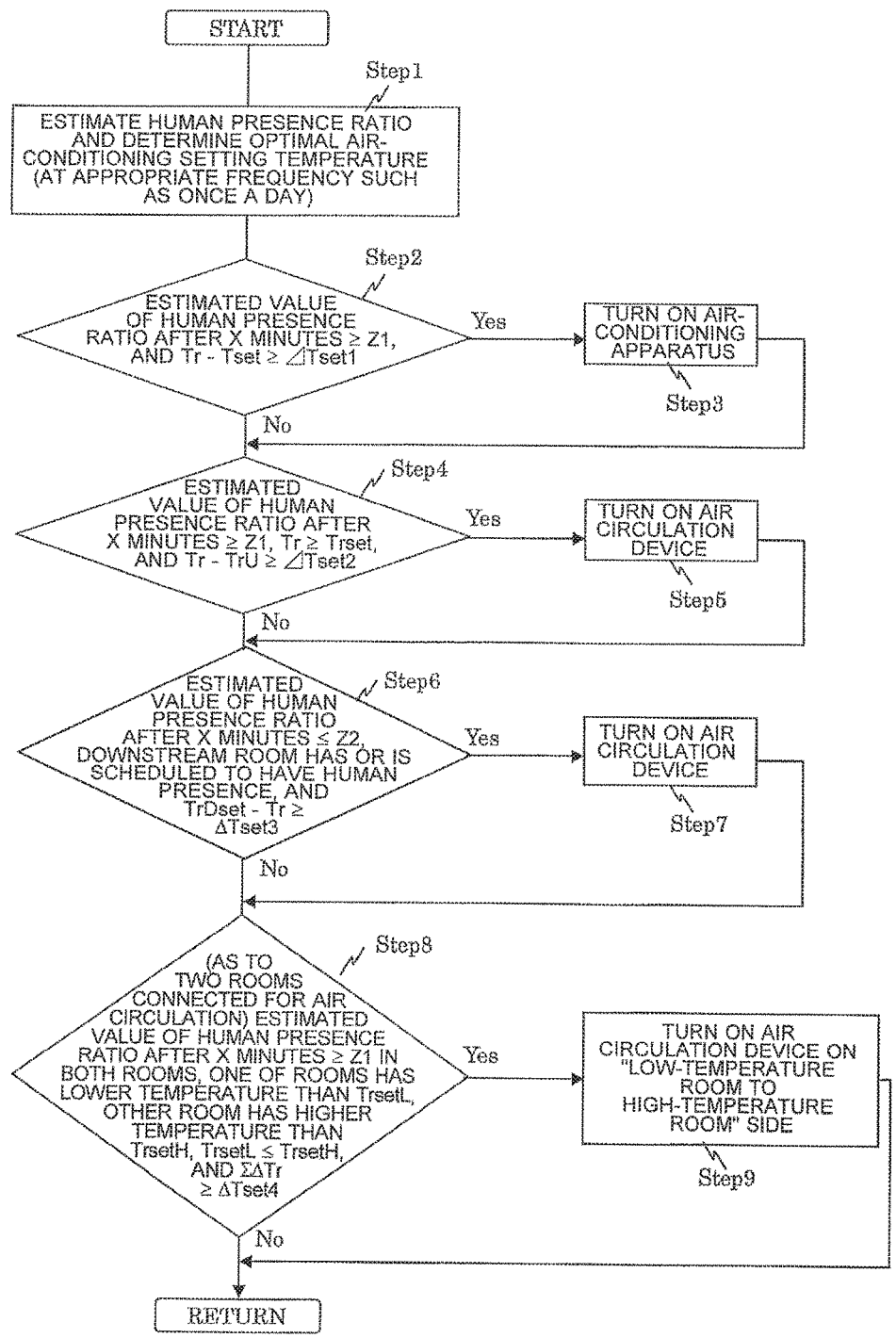
FIG. 4 is a flowchart illustrating an operation of the air-conditioning ventilation system according to Embodiment 1.

FIG. 4 is a flowchart illustrating an operation of the air-conditioning ventilation system according to Embodiment 1.

The operation of the air-conditioning ventilation system will be described below with FIG. 4.

Determinations in FIG. 4 are made for each of the rooms, and whether or not to perform the operation of air-conditioning or air circulation is determined in accordance with the correlation in temperature (such as the level or the difference from the setting temperature) between the room and a room (on the upstream or downstream side) connected thereto with the air circulation device 3.

FIG. 4 illustrates cooling as an example. Since the basic operation of heating is the same as that of cooling except for the reversed relationship of temperature levels, description thereof will be omitted. The case of cooling will be described below.

Signs in FIG. 4 represent the following:
Z1: human presence determination threshold of estimated value of human presence ratio
Z2: human absence determination threshold of estimated value of human presence ratio
Tr: current room temperature
Trset: set room temperature value
TrsetL: setting temperature of low-temperature room
TrsetH: setting temperature of high-temperature room
TrU: room temperature on upstream side of air circulation
TrDset: setting temperature of room on downstream side of air circulation ΣΔtr: sum of absolute values of deviation amounts from setting temperatures of two connected rooms ΔTset1: temperature difference 1 for determining to start air-conditioning ΔTset2: temperature difference 2 for determining to start air circulation ΔTset3: temperature difference 3 for determining to start air circulation ΔTset4: temperature difference 4 for determining to start air circulation Z1 corresponds to a "first threshold" of the present invention.

Further, Z2 corresponds to a "second threshold" of the present invention.

Further, ΔTset1 corresponds to a "first temperature determination value" of the present invention.

Further, ΔTset2 corresponds to a "second temperature determination value" of the present invention.

Further, ΔTset3 corresponds to a "third temperature determination value" of the present invention.

Further, ΔTset4 corresponds to a "fourth temperature determination value" of the present invention.

[Prediction of Human Presence Ratio and Optimal Air-Conditioning Set Temperature]

In Step 1, the optimal air-conditioning ventilation operation estimating unit 112 predicts the "human presence ratio" and the "optimal air-conditioning setting temperature" in each of the rooms, as described above. On the basis of values learned daily during a certain period, the prediction of these is performed at an approximate frequency of once a day, for example, until the next prediction time (the prediction is performed in a time slot of least human activities, such as late at night, for example).

With the learning period set to a certain period, such as two weeks, for example, it is possible to constantly learn the latest status and respond to a change in life pattern.

The prediction result and the individual scheduler of the day are compared to each other, and if there is any discrepancy therebetween, the prediction result is corrected with the scheduler taking precedence. Further, in the case of any change in the scheduler within the day, the prediction is corrected to adjust to the latest schedule. The prediction result is further compared with the current individual behaviors obtained from the sensor unit 1, and if there is any discrepancy therefrom, the prediction is corrected to adjust to the current status. For example, if a person supposed to be present in the room goes out contrary to the prediction, the schedule of the individual is deleted (the plan is restored when the person comes back).

[Air-Conditioning Operation with in-Room Presence Estimation (Precooling/Preheating)]

In Step 2, with the aforementioned prediction of the "human presence ratio," the controller 5 starts air-conditioning the room expected to have human presence at a time shortly before the human presence in the room, such as X=30 minutes, for example.

That is, if the temperature difference between the current room temperature (Tr) and the set room temperature value (Trset) equals or exceeds ΔTset1 in a room with an estimated value of the human presence ratio after the lapse of X minutes equaling or exceeding Z1, the controller 5 proceeds to Step 3 to start the operation of the air-conditioning apparatus 2 provided in the room or increase air-conditioning capacity of the air-conditioning apparatus 2.

The X minutes corresponds to a "first time" of the present invention.

Specifically, if the estimated value of the human presence ratio after the X minutes equals or exceeds the threshold Z1 (100%=the presence of one person in the room, for example), and if the room temperature of the target room is higher than the setting temperature by ΔTset1 (2 degrees Celsius, for example) or more, the controller 5 proceeds to Step 3 to perform the air-conditioning operation (precooling operation). Alternatively, if the air-conditioning has already been operating and the human presence ratio is estimated to have an increasing trend, the air-conditioning capacity is increased.

After Step 3, or if the conditions of Step 2 are not met, the controller 5 proceeds to Step 4.

Although the estimated value of the human presence ratio after the X minutes and the threshold Z1 are compared to each other in the foregoing description, the present invention is not limited thereto, and the result of estimation as to the presence or absence of any human after the X minutes may also be used.

The above-described configuration enables a preliminary air-conditioning operation reflecting the individual behavior pattern learning results and the individual air-conditioning preferences, allowing the temperature of the room to be adjusted to a comfortable level with a reduced amount of energy (without an unnecessary air-conditioning operation) when a person returns to the room or moves between the room and another room. Further, the comfort is maintainable with a reduced amount of energy and a reduced change in temperature in response to an increase in the human presence ratio.

Further, stored indoor air-conditioning heat energy is effectively used, and air-conditioning energy is prevented from being input to an unnecessary site, allowing energy-saving air-conditioning.

Consequently, the comfort and the energy-saving performance are both attainable.

[Air-Circulation Operation with in-Room Presence Estimation]

In Step 4, with the foregoing prediction of the "human presence ratio," if it is possible to effectively use the air-conditioning energy on the upstream side of the room expected to have human presence, the controller 5 drives the air circulation device to guide cool air from the upstream room and reduce the air conditioning load of the room expected to have the human presence.

That is, if a first room (on the upstream side), which is a room with the estimated value of the human presence ratio after the X minutes equaling or exceeding Z1, has an air conditioning load greater than that of a second room (on the downstream side), which is a room communicating with the first room via the air circulation device 3, the controller 5 proceeds to Step 5 to operate the air circulation device 3 to let the air in the second room flow into the first room.

Specifically, if the estimated value of the human presence ratio after the X minutes equals or exceeds the threshold Z1 (100%=the presence of one person in the room, for example), the room temperature (Tr) of the target room is higher than the setting temperature (Trset), and the room temperature (TrU) of the upstream-side room is lower than the room temperature (Tr) of the target room by ΔTset2 (2 degrees Celsius, for example) or more, the controller 5 proceeds to Step 5 to drive the air circulation device. The air blow direction of the air circulation device corresponds to the direction in which the air flows into the target room.

If the conditions of Step 4 are not met, the controller 5 proceeds to Step 6.

Although the estimated value of the human presence ratio after the X minutes and the threshold Z1 are compared to each other in the foregoing description, the present invention is not limited thereto, and the result of estimation as to the presence or absence of any human after the X minutes may also be used.

The above-described configuration enables a preliminary air circulation operation reflecting the individual behavior pattern learning results and the individual air-conditioning preferences, and the reduction of the air conditioning load of the target room allows the temperature of the room to be promptly adjusted to a comfortable temperature with a reduced amount of energy (energy saving), when a person returns to the room or moves between the room and another room.

Further, through the control of the air-conditioning apparatus 2 and the air circulation device 3 between the rooms with the estimation of an in-room presence ratio and an optimal air-conditioned state (the target temperature, for example) of each of the indoor rooms from the learning results, it is possible to equalize the indoor temperature distribution in a necessary site in accordance with the in-room presence estimation, and thus improve the comfort and prevent heat shock.

[Operation Using Air-Conditioning Energy with Absence Estimation]

In Step 6, with the foregoing prediction of the "human presence ratio," the controller 5 drives the air circulation device 3 to guide the air-conditioning energy of a room in which human absence is expected to the target room (the room estimated to have human presence)) and reduce the air conditioning load of the target room (effective use of unnecessary air-conditioning heat).

That is, if a third room (a room located downstream of the target room), which is a room with an estimated value of the human presence ratio after the X minutes equaling or below Z2, has an air conditioning load smaller than that of a fourth room (the target room), which is a room communicating with the third room via the air circulation device 3, and if human presence in the fourth room within a predetermined time (second lapse time) is estimated, the controller 5 proceeds to Step 7 to operate the air circulation device 3 to let the air in the third room flow into the fourth room.

Specifically, if the estimated value of the human presence ratio after the X minutes equals or falls below the threshold Z2 (25%, for example), the room located downstream of the target room has human presence or is scheduled to have human presence within the predetermined time (within one hour, for example), and the setting temperature (TrDset) of the downstream room is higher than the current room temperature (Tr) of the target room by ΔTset3 (2 degrees Celsius, for example) or more, the controller 5 proceeds to Step 7 to drive the air circulation device. The air blow direction of the air circulation device corresponds to the direction in which the air flows out of the target room into the downstream room.

After Step 7, or if the conditions of Step 6 are not met, the controller 5 proceeds to Step 8.

Although the estimated value of the human presence ratio after the X minutes and the threshold Z2 are compared to each other in the foregoing description, the present invention is not limited thereto, and the result of estimation as to the presence or absence of any human after the X minutes may also be used.

The above-described configuration enables the effective use of unnecessary air-conditioning heat of the room in which human absence is expected, reflecting the individual behavior pattern learning results and the individual air-conditioning preferences in the effective use of the unnecessary air-conditioning heat, and the reduction of the air conditioning load of the room with human presence allows energy saving. Further, since it is possible to enhance the air-conditioning capacity during start-up of air-conditioning in the room located downstream, the temperature of the room is promptly adjustable to a comfortable temperature.

Further, through the control of the air-conditioning apparatus 2 and the air circulation device 3 between the rooms with the estimation of the in-room presence ratio and the optimal air-conditioned state (the target temperature, for example) of each of the indoor rooms from the learning results, it is possible to equalize the indoor temperature distribution in a necessary site in accordance with the in-room presence estimation, and thus improve the comfort and prevent the heat shock.

[Load Balancing Operation Among Chambers with Human Presence]

In Step 8, if two rooms each with the estimated value of the human presence ratio after the X minutes equaling or exceeding the threshold Z1 communicate with each other via the air circulation device 3, the controller 5 proceeds to Step 9 to operate the air circulation device 3 to let the air in one of the two rooms with a smaller air conditioning load flow into the other room.

Specifically, if each of two rooms connected to the air supply and exhaust ports 4 of the air circulation device 3 has the estimated value of the human presence ratio after the X minutes equaling or exceeding the threshold Z1 (100%=the presence of one person in the room, for example), the room temperature of one of the rooms (a fifth room) is lower than the setting temperature (TrsetL) thereof, the room temperature of the other room (a sixth room) is higher than the setting temperature (TrsetH) thereof, the setting temperature of the one of the rooms (the fifth room) being a low-temperature room is lower than the setting temperature of the other room (the sixth room) being a high-temperature room (TrsetL≤TrsetH), and the sum (ΣΔTr) of the absolute values of the deviation amounts between the room temperatures and the setting temperatures of the two respective rooms equals or exceeds ΔTset4 (3 degrees Celsius, for example), the controller 5 proceeds to Step 9 to drive the air circulation device. The air blow direction of the air circulation device corresponds to the direction in which the air flows from the low-temperature room into the high-temperature room.

After Step 9, or if the conditions of Step 8 are not met, the controller 5 returns to Step 1 to repeat the above-described operation.

Although the estimated value of the human presence ratio after the X minutes and the threshold Z1 are compared to each other in the foregoing description, the present invention is not limited thereto, and the result of estimation as to the presence or absence of any human after the X minutes may also be used.

The above-described configuration enables the effective use of unnecessary air-conditioning heat (overcooling, in the case of cooling) in the room estimated to have human presence, reflecting the individual behavior pattern learning results and the individual air-conditioning preferences in the effective use of the unnecessary air-conditioning heat (energy saving), and at the same time enables the use of air-conditioning to a room in which an air-conditioning target level has not been reached (undercooled in the case of cooling).

Further, through the control of the air-conditioning apparatus 2 and the air circulation device 3 between the rooms with the estimation of the in-room presence ratio and the optimal air-conditioned state (the target temperature, for example) of each of the indoor rooms from the learning results, it is possible to equalize the indoor temperature distribution in a necessary site in accordance with the in-room presence estimation, and thus improve the comfort and prevent the heat shock.

REFERENCE SIGNS LIST 1 sensor unit 2 air-conditioning apparatus 3 air circulation device 4 air supply and exhaust port 5 controller 101 hygrothermal detector 102 wind velocity detector 103 illuminance detector 104 human detector 105 communication unit 106 environment measuring unit 107 individual preference learning unit 108 individual behavior pattern learning unit 109 input unit 110 calendar 111 clock 112 optimal air-conditioning ventilation operation estimating unit

The invention claimed is:

1. An air-conditioning ventilation system comprising:
at least one ventilation device configured to circulate air among a plurality of rooms;
at least one air-conditioning apparatus provided in at least one of the plurality of rooms;
a human detector provided in each of the plurality of rooms and configured to detect at least one of a height and a body temperature identifying an individual entity of a human present in a corresponding one of the rooms in which the human detector is provided;
a temperature detector provided to each of the plurality of rooms and configured to detect a temperature in a corresponding one of the rooms in which the temperature detector is provided;
an input unit configured to receive input of air-conditioning preference information including at least a setting temperature for each of the plurality of rooms, together with information identifying an individual entity of humans; and
a controller configured to
receive information obtained through detection by the human detector as individual behavior pattern information identifying the individual entity of the human present in each of the plurality of rooms, and store the individual behavior pattern information for each of the plurality of rooms,
estimate presence or absence of any human in each of the plurality of rooms, or a human presence ratio representing a number of humans present per unit time in each of the plurality of rooms, on a basis of a past result of detection by the human detector, and determine a target temperature for each of the plurality of rooms on a basis of individual preference information of the identified individual entity indicated by the individual behavior pattern information for each of the plurality of rooms, and
control the ventilation device and the air-conditioning apparatus on a basis of the estimated presence or absence of the human in the room, or the estimated human presence ratio, and the determined target temperature, wherein
the controller is configured to control the ventilation device and the air-conditioning apparatus, on a basis of a temperature difference between the temperature detected by the temperature detector and the target temperature set for each of the plurality of rooms and the result of the estimation by the controller, to bring the temperature in the corresponding one of the rooms close to the target temperature,
if a first room, which is one of the plurality of rooms with an estimated value of the human presence ratio after lapse of a first time equaling or exceeding a first threshold, has an air conditioning load greater than an air conditioning load of a second room, which is another one of the plurality of rooms communicating with the first room via the ventilation device, the controller is configured to operate the ventilation device to let air in the second room flow into the first room,
when the air-conditioning apparatus performs a cooling operation, the controller is configured to operate the ventilation device to let air in the second room flow into the first room, if a temperature of the first room is higher than a temperature of the second room, the temperature of the first room is higher than the target temperature thereof, and a temperature difference between the temperature of the first room and the temperature of the second room equals or exceeds a second temperature determination value, and
when the air-conditioning apparatus performs a heating operation, the controller is configured to operate the ventilation device to let the air in the second room flow into the first room, if the temperature of the first room is lower than the temperature of the second room, the temperature of the first room is lower than the target temperature thereof, and the temperature difference between the temperature of the first room and the temperature of the second room equals or exceeds the second temperature determination value.

2. The air-conditioning ventilation system of claim 1, wherein the controller is configured to classify the individual behavior pattern information in accordance with at least one of a time, a time slot, a date, and a day of a week.

3. The air-conditioning ventilation system of claim 1, wherein the individual behavior pattern information includes the at least one of the height, and the body temperature, and external appearance information of the human detected by the human detector.

4. The air-conditioning ventilation system of claim 1, wherein the controller is configured to store the individual behavior pattern information in a certain past period.

5. The air-conditioning ventilation system of claim 1, wherein the controller is configured to update the individual behavior pattern information at each lapse of a time, a time slot, a date, or a day of the week.

6. The air-conditioning ventilation system of claim 1, wherein the controller is configured to store, for each of the humans, the air-conditioning preference information input to the input unit, by classifying the air-conditioning preference information in accordance with at least one of a time, a time slot, a date, and a day of the week.

7. The air-conditioning ventilation system of claim 6, wherein the controller is configured to estimate the individual entity of the human present in each of the plurality of rooms, on a basis of the stored individual behavior pattern information, and determine the target temperature, on a basis of the air-conditioning preference information of the estimated individual entity.

8. The air-conditioning ventilation system of claim 1, wherein if the temperature difference between the temperature detected by the temperature detector and the target temperature set for each of the plurality of rooms at a current time equals or exceeds a first temperature determination value in any of the plurality of rooms with the estimated value of the human presence ratio after lapse of the first time equaling or exceeding the first threshold, the controller is configured to start an operation of the air-conditioning apparatus provided in the any of the rooms or increase an air-conditioning capacity of the air-conditioning apparatus.

9. The air-conditioning ventilation system of claim 1, wherein if a third room, which is one of the plurality of rooms with the estimated value of the human presence ratio after lapse of the first time equaling or below a second threshold, has an air conditioning load smaller than an air conditioning load of a fourth room, which is another one of the plurality of rooms communicating with the third room via the ventilation device, and if the presence of any human in the fourth room within a second lapse time is estimated, the controller is configured to operate the ventilation device to let air in the third room flow into the fourth room.

10. The air-conditioning ventilation system of claim 9, wherein
    when the air-conditioning apparatus performs the cooling operation, the controller is configured to operate the ventilation device to let the air in the third room flow into the fourth room, if a temperature of the third room is lower than a temperature of the fourth room, the temperature of the fourth room is higher than the target temperature thereof, and a temperature difference between the temperature of the fourth room and the target temperature thereof equals or exceeds a third temperature determination value, and
    when the air-conditioning apparatus performs the heating operation, the controller is configured to operate the ventilation device to let the air in the third room flow into the fourth room, if the temperature of the third room is higher than the temperature of the fourth room, the temperature of the fourth room is lower than the target temperature thereof, and the temperature difference between the temperature of the fourth room and the target temperature thereof equals or exceeds the third temperature determination value.

11. The air-conditioning ventilation system of claim 1, wherein if two of the plurality of rooms each with the estimated value of the human presence ratio after lapse of the first time equaling or exceeding the first threshold communicate with each other via the ventilation device, the controller is configured to operate the ventilation device to let air in one of the two rooms with a smaller air conditioning load flow into another one of the two rooms.

12. The air-conditioning ventilation system of claim 11, wherein if the target temperature of a fifth room, which is one of the two rooms, is set to be equal to or lower than the target temperature of a sixth room, which is another one of the two rooms, a temperature of the fifth room is lower than the target temperature thereof, a temperature of the sixth room is higher than the target temperature thereof, and a sum of an absolute value of a temperature difference between the temperature of the fifth room and the target temperature thereof and an absolute value of a temperature difference between the temperature of the sixth room and the target temperature thereof equals or exceeds a fourth temperature determination value, the controller is configured to operate the ventilation device to let air in the fifth room flow into the sixth room when the air-conditioning apparatus performs the cooling operation, and the controller is configured to operate the ventilation device to let air in the sixth room flow into the fifth room when the air-conditioning apparatus performs the heating operation.

13. The air-conditioning ventilation system of claim 1, wherein the ventilation device includes a fan and a motor and is operable in a forward or reverse air flow direction, so that the air flow direction is changeable in accordance with the air conditioning state of the rooms.

14. An air-conditioning ventilation system comprising:
    at least one ventilation device configured to circulate air among a plurality of rooms;
    at least one air-conditioning apparatus provided in at least one of the plurality of rooms;
    a human detector provided in each of the plurality of rooms and configured to detect at least one of a height and a body temperature identifying an individual entity of a human present in a corresponding one of the rooms in which the human detector is provided;
    a temperature detector provided to each of the plurality of rooms and configured to detect a temperature in a corresponding one of the rooms in which the temperature detector is provided;
    an input unit configured to receive input of air-conditioning preference information including at least a setting temperature for each of the plurality of rooms, together with information identifying an individual entity of humans; and
    a controller configured to
    receive information obtained through detection by the human detector as individual behavior pattern information identifying the individual entity of the human present in each of the plurality of rooms, and store the individual behavior pattern information for each of the plurality of rooms,
    estimate presence or absence of any human in each of the plurality of rooms, or a human presence ratio representing a number of humans present per unit time in each of the plurality of rooms, on a basis of a past result of detection by the human detector, and determine a target temperature for each of the plurality of rooms on a basis of individual preference information of the identified individual entity indicated by the individual behavior pattern information for each of the plurality of rooms, and
    control the ventilation device and the air-conditioning apparatus on a basis of the estimated presence or absence of the human in the room, or the estimated human presence ratio, and the determined target temperature, wherein
    the controller is configured to control the ventilation device and the air-conditioning apparatus, on a basis of a temperature difference between the temperature detected by the temperature detector and the target temperature set for each of the plurality of rooms and the result of the estimation by the controller, to bring the temperature in the corresponding one of the rooms close to the target temperature, and wherein
    if a third room, which is one of the plurality of rooms with an estimated value of the human presence ratio after lapse of a first time equaling or below a second threshold, has an air conditioning load smaller than an air conditioning load of a fourth room, which is another one of the plurality of rooms communicating with the third room via the ventilation device, and if the presence of any human in the fourth room within a second lapse time is estimated, the controller is configured to operate the ventilation device to let air in the third room flow into the fourth room.

15. An air-conditioning ventilation system comprising:
at least one ventilation device configured to circulate air among a plurality of rooms;
at least one air-conditioning apparatus provided in at least one of the plurality of rooms;
a human detector provided in each of the plurality of rooms and configured to detect at least one of a height and a body temperature identifying an individual entity of a human present in a corresponding one of the rooms in which the human detector is provided;
a temperature detector provided to each of the plurality of rooms and configured to detect a temperature in a corresponding one of the rooms in which the temperature detector is provided;
an input unit configured to receive input of air-conditioning preference information including at least a setting temperature for each of the plurality of rooms, together with information identifying an individual entity of humans; and
a controller configured to
receive information obtained through detection by the human detector as individual behavior pattern information identifying the individual entity of the human present in each of the plurality of rooms, and store the individual behavior pattern information for each of the plurality of rooms,
estimate presence or absence of any human in each of the plurality of rooms, or a human presence ratio representing a number of humans present per unit time in each of the plurality of rooms, on a basis of a past result of detection by the human detector, and determine a target temperature for each of the plurality of rooms on a basis of individual preference information of the identified individual entity indicated by the individual behavior pattern information for each of the plurality of rooms, and
control the ventilation device and the air-conditioning apparatus on a basis of the estimated presence or absence of the human in the room, or the estimated human presence ratio, and the determined target temperature, wherein
the controller is configured to control the ventilation device and the air-conditioning apparatus, on a basis of a temperature difference between the temperature detected by the temperature detector and the target temperature set for each of the plurality of rooms and the result of the estimation by the controller, to bring the temperature in the corresponding one of the rooms close to the target temperature, and wherein
if two of the plurality of rooms each with an estimated value of the human presence ratio after lapse of a first time equaling or exceeding a first threshold communicate with each other via the ventilation device, the controller is configured to operate the ventilation device to let air in one of the two rooms with a smaller air conditioning load flow into another one of the two rooms.

* * * * *